H. S. REYNOLDS.

SPUT FOR METALLIC RECEPTACLES.

APPLICATION FILED FEB. 7, 1921.

Reissued July 18, 1922. 15,413.

Henry S. Reynolds Inventor

By his Attorneys

Kenyon, Kenyon, Sylvester & Hoguet

UNITED STATES PATENT OFFICE.

HENRY S. REYNOLDS, OF BROOKLYN, NEW YORK, ASSIGNOR TO MEURER STEEL BARREL COMPANY, INC., OF NEW YORK, N. Y., A CORPORATION OF NEW YORK.

SPUT FOR METALLIC RECEPTACLES.

15,413. Specification of Reissued Letters Patent. Reissued July 18, 1922.

Original No. 1,332,686, dated March 2, 1920, Serial No. 271,484, filed January 16, 1919. Application for reissue filed February 7, 1921. Serial No. 443,308.

*To all whom it may concern:*

Be it known that I, HENRY S. REYNOLDS, a citizen of the United States, residing at 261 Eckford Street, Brooklyn, in the county of Kings and State of New York, have invented certain new and useful Improvements in Sputs for Metallic Receptacles, of which the following is a specification.

This invention relates to metallic receptacles, such as casks, barrels and the like having openings in the top or sides thereof for the passage of fluids, and more particularly to an improved sput therefor, whereby the opening in the receptacle may not only be reinforced, but made fluid tight, the object of the invention being to provide an improved sput which may be attached quickly in a simple and inexpensive manner without the necessity of welding it as is usual heretofore.

Figure 1:
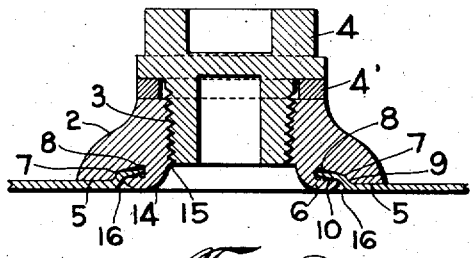
Figure 2:
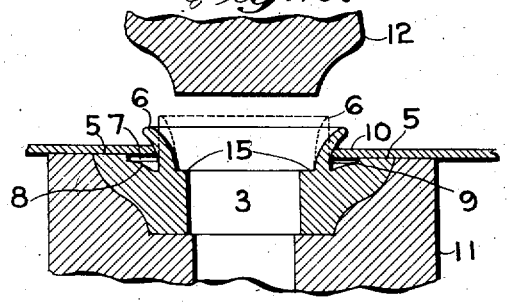
Figure 3:
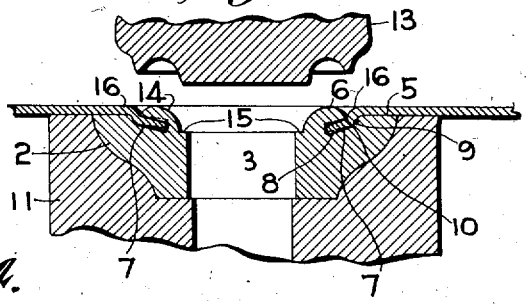
Figure 4:
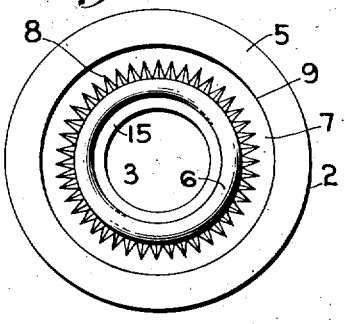

In the drawings accompanying and forming a part of this specification Figure 1 illustrates a cross section of the present improved sput attached to a part of a metal barrel and the plug therefor, Fig. 2 illustrates the first operation of attaching the sput; and shows a cross section of the die and punch, Fig. 3 illustrates the second and final operation of attaching the sput, and also shows a cross section of the die and punch; Fig. 4 is a plan view of the top of the sput prior to its attachment.

Similar figures of reference indicate corresponding parts in the several figures of the drawings.

Various attempts have been made to reinforce and provide a fluid tight or leaf-proof sput opening for metallic receptacles, particularly metallic barrels, with more or less success, it being the usual practice, however, to weld the sput to the barrel. The result of this mode of procedure has been frequently a leaky joint around the opening of the barrel. The present improvement not only does away with the necessity of this welding operation, while at the same time it reinforces the opening and positively prevents a leaky joint.

This improved sput 2 is provided with central bore 3 suitably threaded for the reception of a plug 4 and its gasket 4′. The sput may be of annular form or have hexagonal or other form of sides and is formed with a lateral or horizontally extending flange 5, and an upright or vertical integral locking flange 6 between which an annular recess 7 is formed having a roughened or serrated portion 8 in its bottom adjacent to the inner edge of such recess.

The recess terminates in a comparatively abrupt shoulder 9 around which the metal edge 10 of the barrel is bent and locked. In attaching this improved sput it is placed in a suitable die 11 with the edge 10 of the barrel opening in juxtaposition to the annular recess 7 of the sput and then by means of a punch 12 the vertical integral locking flange 6 is first forced outward and downward substantially to the position shown in Fig. 2, the punch having the shape shown in said Fig. 2. Then by means of a second punch 13 having the shape shown in Fig. 3 this vertical locking flange is forced further downward over the edge 10 of the barrel opening thereby forcing such edge 10 firmly into the annular recess 7 and bending it around the shoulder 9 of such recess, and also forcing the metal of the edge into engagement with the serrated portion 8 of the recess which prevents any tendency of the sput to turn relative to the head or side of the barrel when a wrench is used to remove or tighten the plug.

The vertical integral locking flange when forced down has its top or outer surface 14 substantially flush with the metal of the barrel, and as this flange is of curved or beaded form it provides a neat and pleasing finish around the barrel opening.

Preferably the flange terminates at its base in a shoulder 15 which facilitates the formation of a bendable locking flange.

Thus, I am enabled by a couple of punching operations, to, as it were, cold weld the metal body edge into the annular recess of the sput and lock the same therein by means of a locking flange forced down upon the metal of the body in such a manner that the free edge of the flange will be flush with, or slightly below the shoulder 16 of the barrel metal formed by its bend over the relatively abrupt shoulder 9 of the sput, so that the edge of the barrel opening will have substantially an ogee bend and any possibility of the barrel pulling away from its locking recess and flange prevented, not only by the locking flange but by the shoulder 9. Furthermore, it will be clear that not only are the parts interlocked against relative rotation but that the sheet metal of the receptacle is held against springing out of this interlocked relation and securely locked therein by the same part which forms the fluid-tight joint. At the same time a fluid tight joint is positively obtained by this simple mode of procedure through the medium of this improved sput, moreover the sput is firmly held against rotatable movement on the application of a wrench to the plug or closure either to release or tighten the same.

It is to be understood that by the expressions "bottom wall" or "bottom face" is meant that surface adjacent the bottom of the recess in the sput, irrespective of whether the position of the receptacle as a whole be such as to direct that surface upwardly or downwardly.

I claim as my invention:

1. A sput for a metallic receptacle having an annular flange, and an integral vertical bendable locking flange having therebetween the annular recess provided with a shoulder, said sput having means in position to engage the bottom wall of the free edge of the receptacle adjacent to the opening thereof thereby to prevent the rotation of the sput relatively to the receptacle.

2. A sput for a metallic receptacle having an annular flange, and an integral vertical bendable locking flange having therebetween an annular recess, said recess having a serrated bottom portion in position to engage the bottom wall of the free edge of the receptacle adjacent to the opening thereof thereby to prevent the rotation of the sput relatively to the receptacle.

3. A metallic receptacle having an opening, a sput having a laterally extending flange, and an integral bendable locking flange having therebetween an annular recess with the edge of the opening clamped in said recess by said locking flange, said recess also having a shoulder around which the edge of the receptacle is bent, and said sput having means in position to engage the bottom wall of the free edge of the receptacle adjacent to the opening thereof thereby to prevent the rotation of the sput relatively to the receptacle.

4. A metallic receptacle having an opening, a sput having a laterally extending flange, and an integral bendable locking flange having therebetween an annular recess with the edge of the opening clamped in said recess by said locking flange, said recess also having a roughened or serrated portion into engagement with which the bottom face adjacent to the free edge of the receptacle opening is forced.

5. A metallic receptacle having an opening, a sput having a threaded bore, a laterally extending flange, and an integral bendable locking flange having therebetween an annular recess having an abrupt shoulder, said recess having means in position to engage the bottom wall of the free edge of the receptacle adjacent to the opening thereof thereby to prevent the rotation of the sput relatively to the receptacle, the metal of the receptacle being clamped in said recess by bending the locking flange over the edge of such metal.

6. A metallic receptacle having an opening, a sput having a threaded opening, a laterally extending flange, and an integral bendable locking flange having therebetween an annular recess having an abrupt shoulder, said recess having means in position to engage the bottom wall of the free edge of the receptacle adjacent to the opening thereof thereby to prevent the rotation of the sput relatively to the receptacle, the metal of the receptacle being clamped in said recess by bending the locking flange over the edge of such metal and the surface of the locking flange being substantially flush with the surface of the adjacent metal.

7. A receptacle having an annular opening, a sput having an annular recess for the reception of the edge of such opening, and an integral bendable locking flange clamping the metal edge of the receptacle into the recess of said sput, said recess terminating in an abrupt shoulder around which the metal of the receptacle is bent, said sput also having means in position to engage the bottom wall of the free edge of the receptacle adjacent to the opening thereof for preventing the rotation of the sput relatively to the receptacle.

8. A metallic receptacle having an opening, and a sput therein having a threaded opening and provided with a recess about the same within which the edge portion of said receptacle rests, the engaging parts of said edge portion and said sput being shaped to interlock against relative rotation and said sput being provided with an overlapping part which grips said edge portion in said recess and holds it in position in said interlocking relation.

9. A metallic receptacle having an opening, and a sput therein having a threaded opening and provided with a recess about the same into which the edge portion of said receptacle is forced out of its plane, the engaging surfaces of said edge portions and said sput being shaped to lie at varying distances from the axis of the sput whereby they are held against relative rotation, and said sput being provided with a flange which is bent to grip said edge portion in said recess and hold said engaging surfaces in said relation.

10. A metallic receptacle having an opening therein, and a sput fitted within said opening and provided with a recess offset with respect to the plane of the adjacent portion of the receptacle and with a bendable flange, the edge portions of said receptacle being forced into said offset recess and into engagement with interlocking irregularities formed on the sput, and said flange on said sput being bent to grip said edge portion within said recess and hold it in said interlocking relation.

Signed at New York, N. Y., this 4th day of January, 1921.

HENRY S. REYNOLDS.